US010929432B2

(12) United States Patent
Bansal et al.

(10) Patent No.: US 10,929,432 B2
(45) Date of Patent: Feb. 23, 2021

(54) SYSTEM AND METHOD FOR INTELLIGENT DATA-LOAD BALANCING FOR BACKUPS

(71) Applicant: EMC IP Holding Company LLC, Hopkinton, MA (US)

(72) Inventors: Aaditya Bansal, Bangalore (IN); Sunil Yadav, Bangalore (IN); Amarendra Behera, Varthur (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 100 days.

(21) Appl. No.: 16/254,781

(22) Filed: Jan. 23, 2019

(65) Prior Publication Data

US 2020/0233755 A1 Jul. 23, 2020

(51) Int. Cl.
*G06F 16/27* (2019.01)
(52) U.S. Cl.
CPC ................. *G06F 16/273* (2019.01)
(58) Field of Classification Search
CPC ............ G06F 16/211; G06F 16/2453; G06F 16/24542; G06F 16/27; G06F 16/9566; G06F 16/128; G06F 16/238; G06F 16/95
USPC .................................................. 707/640, 654
See application file for complete search history.

(56) References Cited

U.S. PATENT DOCUMENTS

| 9,002,798 B1* | 4/2015 | Raj ....................... G06F 16/128 707/654 |
| 2003/0005120 A1* | 1/2003 | Mutalik .............. G06F 11/1469 709/225 |
| 2007/0288534 A1* | 12/2007 | Zak ..................... G06F 11/1469 |
| 2013/0103639 A1* | 4/2013 | Greenberg ............... G06F 9/44 707/608 |
| 2014/0280373 A1* | 9/2014 | Raitto ............... G06F 16/24542 707/803 |
| 2015/0143053 A1* | 5/2015 | Quimbey ............ G06F 12/0888 711/133 |
| 2020/0104376 A1* | 4/2020 | Earnesty, Jr. ........... G06F 9/455 |

* cited by examiner

*Primary Examiner* — James Trujillo
*Assistant Examiner* — Fariborz Khoshnoodi
(74) *Attorney, Agent, or Firm* — Chamberlain Hrdlicka

(57) ABSTRACT

A method for backing up databases includes generating a Database-Host Mapping (DHM) associated with a backup request in response to receiving the backup request, performing a database redistribution analysis based on the DHM and a preferred server order list (PSOL) to generate a Host-Database Mapping (HDM), and initiating a backup of a plurality of databases using the plurality of hosts specified in the HDM.

18 Claims, 7 Drawing Sheets

Host Information 300

| Host | Active Database (DB) | Passive DBs |
|---|---|---|
| Host 1 | DB2 | DB3 |
| Host 2 | DB4 | DB2 |
| Host 3 | DB1 | DB2, DB4 |
| Host 4 | DB5 | DB5, DB2 |
| Host 5 | DB3 | DB1, DB5, DB3 |

FIG. 3A

Database-Host Mapping 310

| DB | DB Size | Hosts Available |
|---|---|---|
| DB1 | 1 GB | Host 5 |
| DB2 | 10 GB | Host 2, Host 3, Host 4 |
| DB3 | 3 GB | Host 1, Host 5 |
| DB4 | 5 GB | Host 3 |
| DB5 | 1 GB | Host 5, Host 4 |

FIG. 3B

Generated PSOL 320

| Host | Compute Score | Network Bandwidth Score | Storage Availability Score | Priority |
|---|---|---|---|---|
| Host 1 | 0.6 | 0.5 | 0.5 | 1 |
| Host 2 | 0.2 | 0.4 | 0.3 | 3 |
| Host 3 | 0.35 | 0.6 | 0.6 | 2 |
| Host 4 | 0.4 | 0.1 | 0.2 | 4 |
| Host 5 | 0.1 | 0.1 | 0.2 | 5 |

FIG. 3C

Host-Database Mapping 330

| Host | Database |
|---|---|
| Host 1 | DB3 |
| Host 3 | DB4 |
| Host 2 | DB2 |
| Host 4 | DB5 |
| Host 5 | DB1 |

FIG. 3D

SYSTEM AND METHOD FOR INTELLIGENT DATA-LOAD BALANCING FOR BACKUPS

BACKGROUND

Computing devices may include any number of internal components such as processors, memory, and persistent storage. Each of the internal components of a computing device may be used to generate data. The process of generating, storing, backing-up, and recovering data may utilize computing resources of the computing devices such as processing and storage. The utilization of the aforementioned computing resources to generate and/or recover backups may impact the overall performance of the computing resources.

SUMMARY

In general, in one aspect, the invention relates to a method for backing up databases in accordance with one or more embodiments of the invention. The method includes generating a Database-Host Mapping (DHM) associated with a backup request in response to receiving the backup request, performing a database redistribution analysis based on the DHM and a preferred server order list (PSOL) to generate a Host-Database Mapping (HDM), and initiating a backup of a plurality of databases using the plurality of hosts specified in the HDM.

In general, in one aspect, the invention relates to a non-transitory computer readable medium comprising computer readable program code, which when executed by a computer processor enables the computer processor to perform a method for backing up databases. The method includes generating a Database-Host Mapping (DHM) associated with a backup request in response to receiving the backup request, performing a database redistribution analysis based on the DHM and a preferred server order list (PSOL) to generate a Host-Database Mapping (HDM), and initiating a backup of a plurality of databases using the plurality of hosts specified in the HDM.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIGS. 3A-3D show an example in accordance with one or more embodiments of the invention.

DETAILED DESCRIPTION

Figure 1:
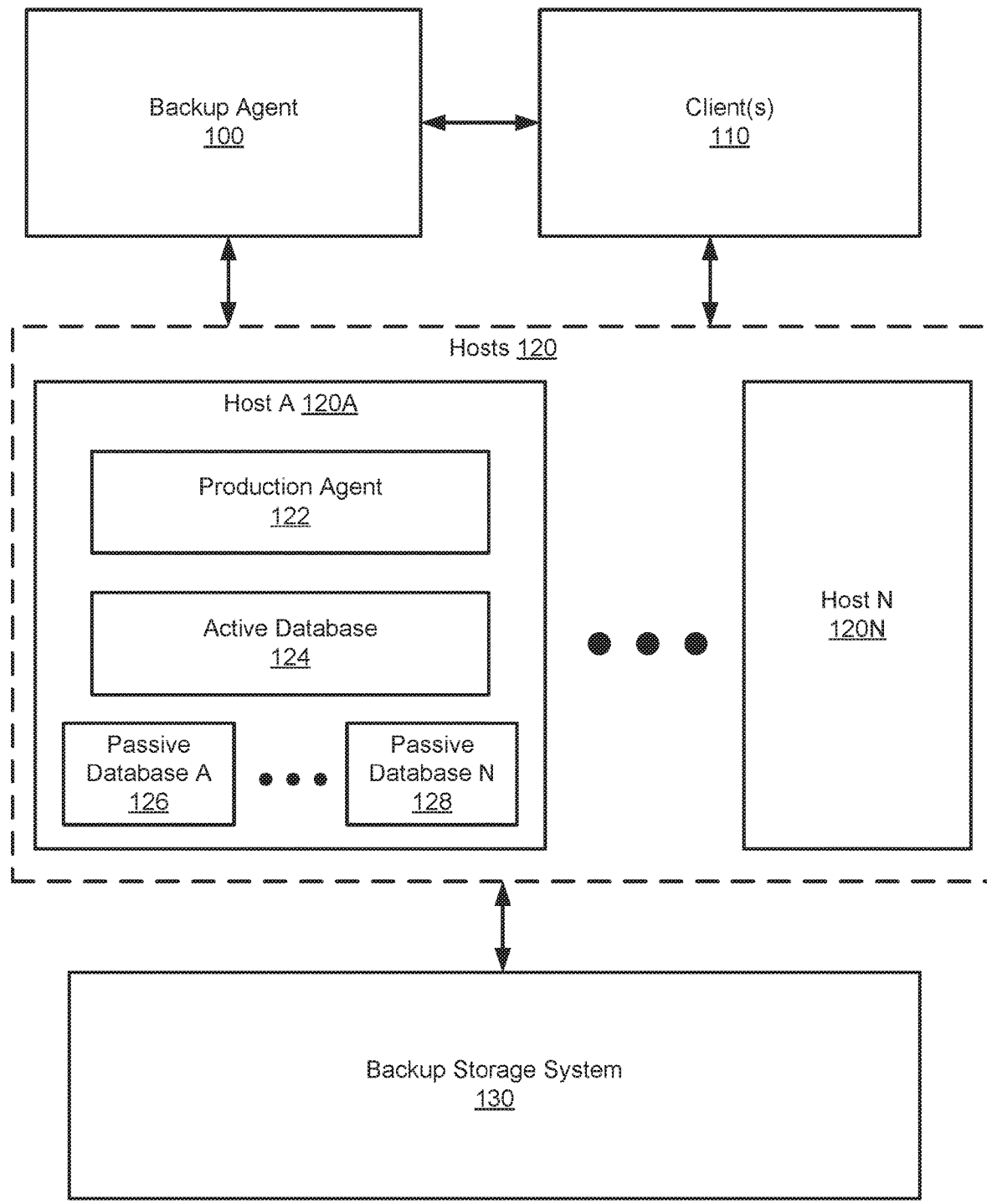
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems and methods for backing up databases. More specifically, embodiments of the invention perform methods for distributing a backup load among a number of hosts performing backups of the databases. Embodiments of the invention may perform methods for determining which host performs the backup of each of the databases using a priority ordering of the hosts and a capability of each host to back up a database. In one or more embodiments of the invention, the priority ordering may be obtained from a user or may be generated by analyzing available resources of each host and ranking the hosts based on the resources. Embodiments of the invention may distribute the backup load by assigning each database to a host in the priority ordering based on the size of the databases and/or by taking into account other factors.

FIG. 1 shows an example system in accordance with one or more embodiments of the invention. The system may include a backup agent (100), one or more clients (110), two or more hosts (120A, 120N), and a backup storage system (130). Each component of the system illustrated in FIG. 1 is discussed below.

In one or more embodiments of the invention, the client(s) (110) send data to be stored in the hosts (120A, 120N). The clients (110) may request to modify and/or update the data stored in active databases (e.g., 122) running on the hosts (120A, 120N). Additionally, the client(s) (110) may request issues requests to generate backups of the data and to send generated backups to the backup storage system (130).

Figure 4:
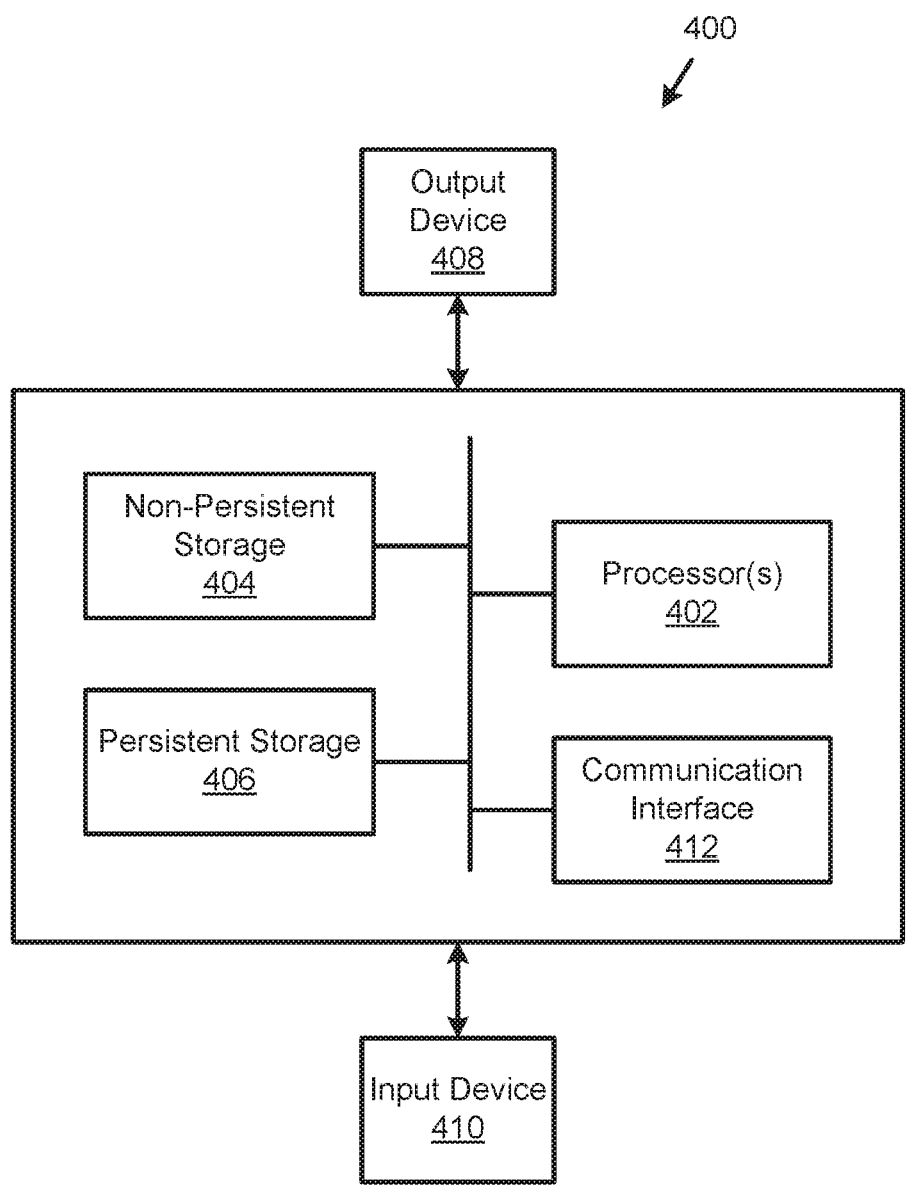
FIG. 4 shows a diagram of a computing device in accordance with one or more embodiments of the invention.

In one or more embodiments of the invention, the client(s) (110) are implemented as computing devices (see e.g., FIG. 4). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client(s) (110) described throughout this application.

In one or more embodiments of the invention, the client(s) (110) are implemented as a logical device. The logical device may utilize the computing resources of any number of computing devices and thereby provide the functionality of the client(s) (110) described throughout this application.

In one or more embodiments of the invention, the hosts (120A, 120N) include databases (124, 126, 128). The databases may include data that may be accessed, modified, and/or otherwise associated with the client(s) (110). In one or more embodiments of the invention, backups of the databases (124, 126, 128) are backed up by a production agent (122) of the respective host (120A, 120N). Each component of the hosts (120A, 120N) illustrated in the system of FIG. 1 is discussed below.

In one or more embodiments of the invention, the production agent (122) of a host (120A, 120N) generates backups of passive databases (126, 128) as requested by the backup agent (100). The production agent (122) may send the backups to the backup storage system (130) after the backups are completed.

In one or more embodiments of the invention, the production agent (122) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the production agent (122) described throughout this application.

In one or more of embodiments of the invention, the production agent (122) of a host (120A, 120N) is implemented as computer instructions, e.g., computer code, stored on a persistent storage that when executed by a processor (not shown) of the host, which causes the host (120A, 120N) to provide the functionality of the production agent (122) described throughout the application.

In one or more embodiments of the invention, an active database (124) is a database, stored in persistent storage of the host (120A, 120N), that may be written to by the host (120A, 120N). In other words, the active database (124) of a host (120A, 120N) may be modified by the host (120A, 120N) as specified by the client(s) (110) that use the active database (122). For example, a client (110) may upload data to the host (120A, 120N) and request the host (120A, 120N) store the data in the active database (124). Further, the active database (122) may also include functionality to service requests (e.g., queries for data) initiated by clients (110) and/or by a host (120A, 120N).

In one or more embodiments of the invention, the passive databases (126, 128) are copies of active databases (124). The copies may be of active databases (124) hosted by other hosts (120A, 120N). In other words, a passive database (e.g., 126) hosted by host A (120A) may be a copy of an active database (not shown) hosted by host N (120N). Each host (120A, 120N) may store any number of active (124) and/or passive databases (126, 128) without departing from the invention. In one or more embodiments of the invention, a host (120A, 120N) may perform a backup of a database if the database is a passive database stored in the host (120A, 120N). In other words, the host (120A, 120N) may not perform a backup of a database if the database is not stored as a passive database in the host (120A, 120N).

In one or more embodiments of the invention, each host (120A, 120N) is a computing device (see e.g., FIG. 4). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the host (120A, 120N) described throughout this application.

In one or more embodiments of the invention, the host (120A, 120N) is implemented as a logical device. The logical device may utilize the computing resources of any number of computing devices and thereby provide the functionality of the host (120A, 120N) described throughout this application.

In one or more embodiments of the invention, the backup agent (100) orchestrates the backup generation of one or more databases (124, 126, 128). The backup agent (100) may orchestrate, using host information, the backup generation(s) by prompting the hosts (120A, 120N) to generate a backup of passive databases (126, 128) and to send the resulting backup to a backup storage system. The host information may list each host (120A, 120N) and specify the passive databases stored in each of the hosts (120A, 120N). The backup agent (100) may use the host information to determine which of the passive databases (126, 128) each host (120A, 120N) is to backup. The backup agent (100) may subsequently prompt each host (120A, 120N) to generate the respective backups and send them to the backup storage system (130). The backup agent (100) may include functionality to orchestrate the backup generation of the databases using methods illustrated in FIGS. 2A-2C.

In one or more embodiments of the invention, the backup agent (100) is implemented as a computing device (see e.g., FIG. 4). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup agent (100) described throughout this application and/or all, or a portion thereof, of the methods illustrated in FIGS. 2A-2C.

In one or more embodiments of the invention, the backup agent (100) is implemented as a logical device. The logical device may utilize the computing resources of any number of computing devices and thereby provide the functionality of the backup agent (100) described throughout this application and/or all, or a portion thereof, of the methods illustrated in FIGS. 2A-2C.

In one or more embodiments of the invention, the backup storage system (130) is a system that stores backups. The backups stored in the backup storage system may be backups of databases (124, 126, 128). The backup storage system (130) may obtain the backups from the hosts (120A, 120N). Additionally, the backup storage system (130) may send the backups to the hosts (120A, 120N) when requested. The backups may be used to restore the databases to a previous point in time.

In one or more embodiments of the invention, the backup storage system (130) is implemented as a computing device (see e.g., FIG. 4). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup storage system (130) described throughout this application.

In one or more embodiments of the invention, the backup storage device (130) is implemented as a computer cluster. The computer cluster may include any number of computing devices and thereby provide the functionality of the backup storage device (130) described throughout this application.

In one or more embodiments of the invention, the backup storage device (130) is implemented as a logical device. The logical device may utilize the computing resources of any number of computing devices and thereby provide the functionality of the backup storage device (130) described throughout this application.

Figure 2A:
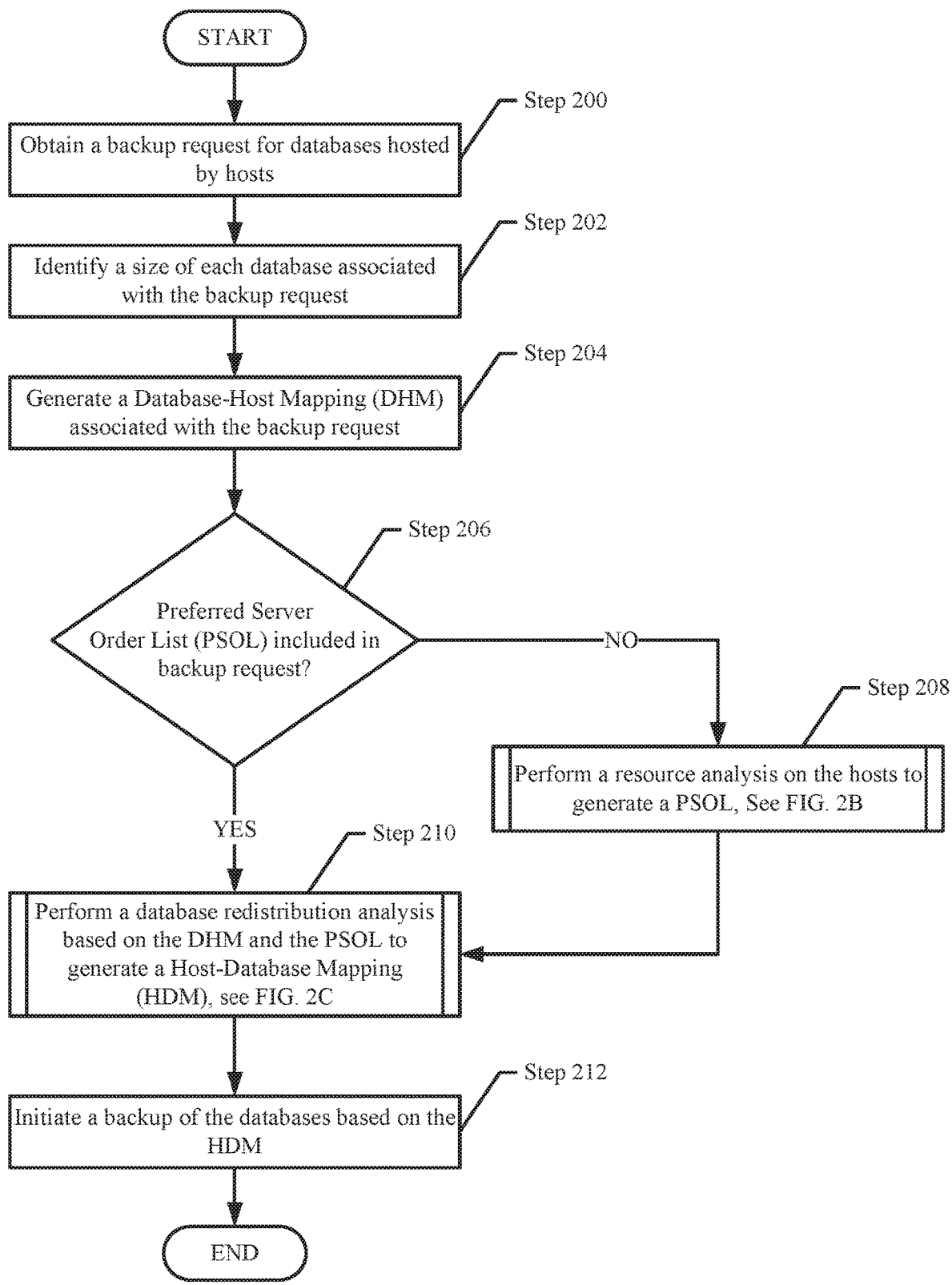
FIG. 2A shows a flowchart for managing backups of databases in accordance with one or more embodiments of the invention.
Figure 2B:
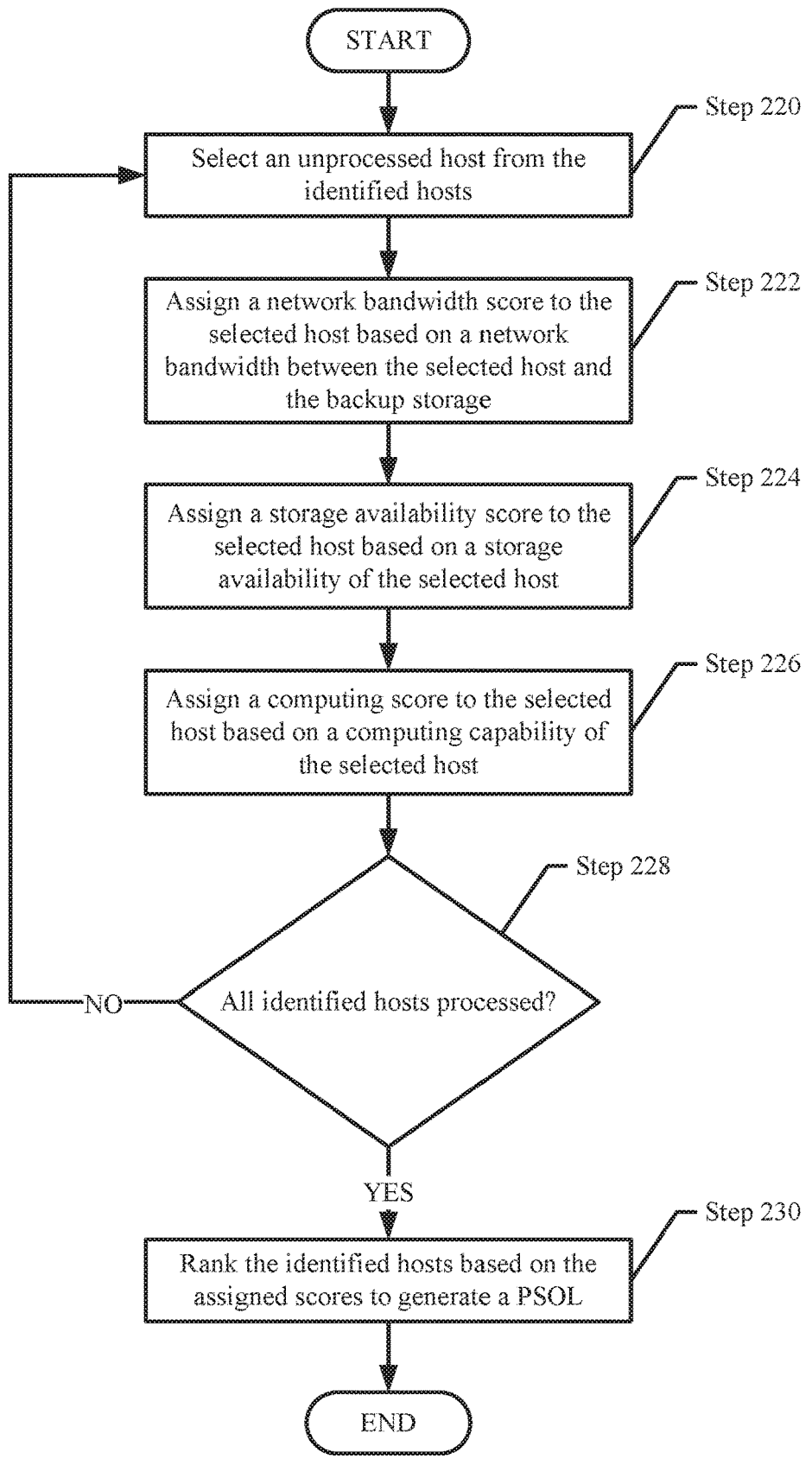
FIG. 2B shows a flowchart for performing a resource analysis in accordance with one or more embodiments of the invention.
Figure 2C:
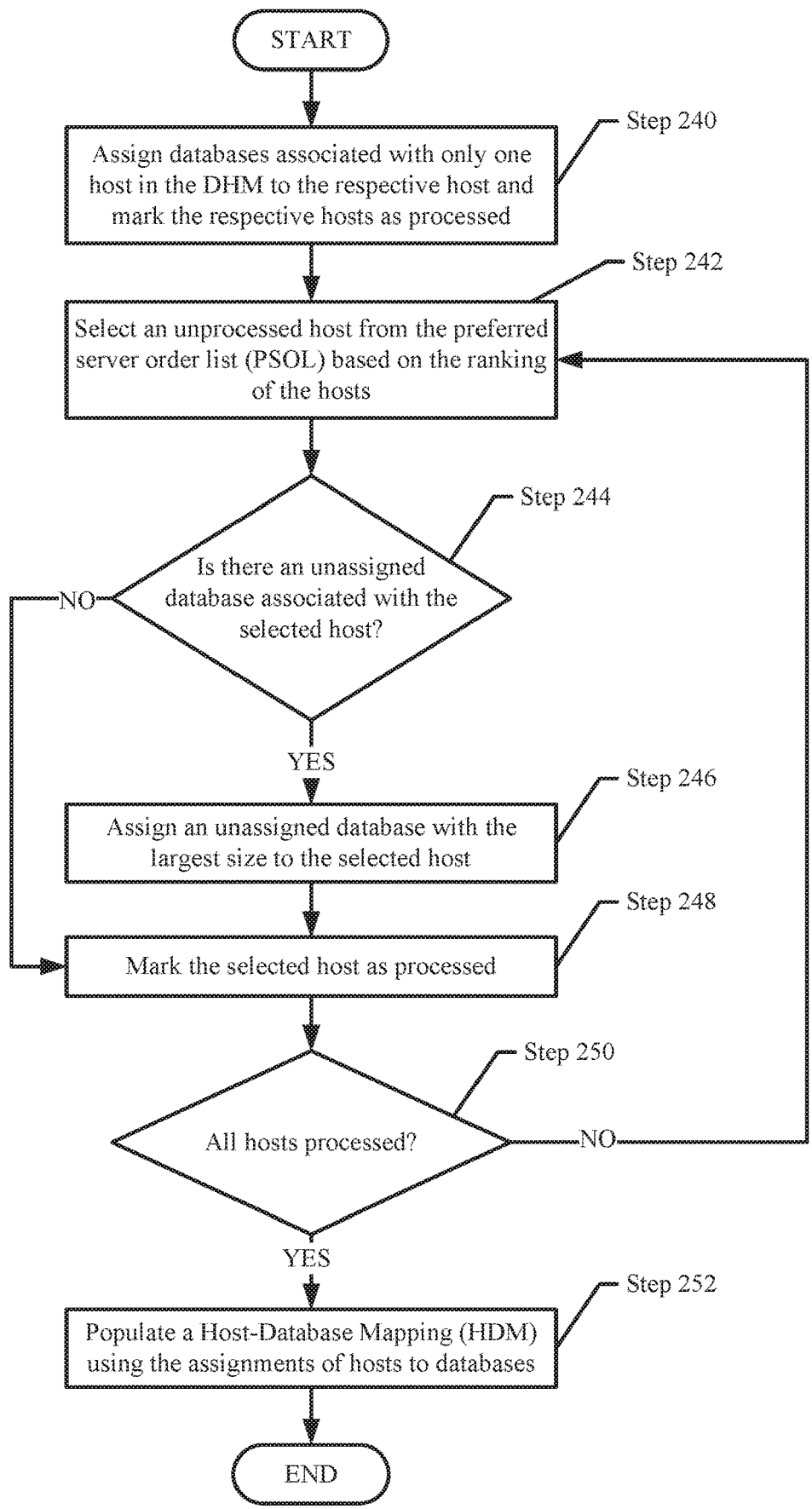
FIG. 2C shows a flowchart for performing a database redistribution analysis in accordance with one or more embodiments of the invention.

FIGS. 2A-2C show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2C may be performed in parallel with any other steps shown in FIGS. 2A-2C without departing from the scope of the invention.

The methods shown in FIGS. 2A-2C may be performed by, for example, a backup agent (100, FIG. 1). Other components of the system illustrated in FIG. 1 may perform the methods shown in FIGS. 2A-2C without departing from the invention.

Turning to FIG. 2A, FIG. 2A shows a flowchart for managing backups of databases in accordance with one or more embodiments of the invention.

In step 200, a backup request for databases hosted by hosts is obtained. In one or more embodiments of the invention, the backup request is obtained from a client. The backup request may specify passive databases to be backed up (from here forward the passive databases shall be referred to as "databases"). Further, the backup request may specify a number of identified hosts capable of performing the backups. The hosts performing the backups may incur a backup load by each database. A backup load may be an amount of computing resources (e.g., processing and memory) used to generate backups of databases by a host. The backup load may be based on a size of the database and the number of databases being backed up by the host at a given point in time.

In step 202, a size of each database associated with the backup request is identified. A database may be associated with the backup request if the backup request specifies that the database is to be backed up.

In step 204, a Database-Host Mapping (DHM) is generated based on the backup request. The backup agent may generate the DHM using host information about the hosts specified in the backup request. As discussed above, the host information specifies each host and the databases hosted by the host. The databases may be the passive databases and/or the active databases. The DHM generated by the backup agent may specify each database associated with the backup request and the hosts in which the database is a passive database. Said another way, the DHM may specify which host may perform a backup of each database. Additionally, the DHM may include the identified sizes of each database.

In step 206, a determination is made about whether a preferred server order list (PSOL) is included in the backup request. If a preferred server order list (PSOL) is included in the backup request, the method proceeds to step 208; otherwise, the method proceeds to step 210.

In one or more embodiments of the invention, a PSOL is a data structure that specifies a priority order that ranks the hosts. In one embodiment of the invention, the PSOL is generated by the client sending the backup request. The PSOL may specify that a backup load be distributed among the hosts by having the higher-ranked hosts take on a higher backup load relative to lower-ranked hosts in the PSOL.

In one or more embodiments, the PSOL is not included in the backup request. In this scenario, the backup request may specify the hosts that may perform backups, but the backup request may not include a ranking of the hosts that would have been included with a PSOL. In this scenario, the method proceeds to step 208.

In step 208, a resource analysis is performed on the hosts to generate a PSOL. The resource analysis includes determining factors that may impact the process of generating a backup of the databases for each host. The factors may be determined by identifying resources provided by the hosts (e.g., network availability, storage availability, and/or processing capability), assigning a score to the host for each identified resource, and ranking the hosts based on the assigned scores.

In one or more embodiments of the invention, the resource analysis is performed via the method of FIG. 2B. The resource analysis may be performed via other methods without departing from the invention.

In step 210, a database redistribution analysis is performed based on the DHM and the PSOL (which may be obtained from the client or generated via step 208) to generate a Host-Database Mapping (HDM). The HDM is a data structure that specifies each host and the database(s) that the host is to backup. Each host may backup zero or more databases based on the database redistribution analysis. The database redistribution analysis is performed by enumerating the PSOL to assign each host to a database based on a size of the database and a relative ranking of the host. For example, the highest-ranked host may be assigned to the largest-sized unassigned database that the host can backup up. The next highest-ranked host may be assigned to the largest-sized unassigned database that the next highest-ranked host can backup up. The process may be repeated until all databases have been assigned to a host.

In one or more embodiments of the invention, the database redistribution analysis is performed via the method illustrated in FIG. 2C. The database redistribution analysis is performed via other methods without departing from the invention.

In step 212, a backup of the databases is initiated based on the HDM. In one or more embodiments of the invention, the backup agent prompts each host specified in the HDM to perform a backup for each corresponding database. The backups may be sent to a backup storage system.

FIG. 2B shows a flowchart for performing a resource analysis in accordance with one or more embodiments of the invention. In Step 220, an unprocessed host is selected from the identified hosts.

In step 222, a network bandwidth score is assigned to the selected host based on a network bandwidth between the selected host and the backup storage system. In one or more embodiments of the invention, the network bandwidth score is a numerical value that reflects the network bandwidth. The network bandwidth score may be a high number if the network bandwidth is large. In contrast, the network bandwidth score may be low number if the network bandwidth is low.

In one or more embodiments of the invention, the network bandwidth may be measured by prompting the selected host to send data of a determinate size to the backup system and record a time it takes for the backup system to receive the data. The determinate size of the data may be divided by the recorded time to obtain a network bandwidth.

In step 224, a storage availability score is assigned to the selected host based on a storage availability of the selected host. In one or more embodiments of the invention, the storage availability score is a numerical value that reflects the storage availability (i.e., how much available space remains in the persistent storage). A storage availability score with a high value represents large storage availability for the selected host. In contrast, low storage availability may be represented with a low storage availability score.

In step 226, a computing score is assigned to the selected host based on a computing capability of the selected host. In one or more embodiments of the invention, the computing score is a numerical value that reflects the computing capability (i.e., processing power) of the selected host. A high computing capability (e.g., fast CPU processing) may be reflected with a high computing score. In contrast, a low computing capability (e.g., slow CPU processing) may be reflected with a low score.

In one or more embodiments of the invention, the selected host is marked as processed after completing steps 222-226.

In step 228, a determination is made about whether all identified hosts have been processed. If all identified hosts have been processed, the method proceeds to step 230; otherwise, the method proceeds to step 220.

In step 230, the identified hosts are ranked based on the assigned scores. After the identified hosts are ranked, the backup agent may generate a PSOL using the ranks.

In one or more embodiments of the invention, the identified hosts are ranked by combining (with or without weighting) the aforementioned scores to generate an aggregate score for each of the hosts. The hosts are then ranked using their aggregate scores.

FIG. 2C shows a flowchart for performing a database redistribution analysis in accordance with one or more embodiments of the invention. In Step 240, databases associated with only one host in the DHM is assigned to the respective host. The respective hosts may subsequently be marked as processed.

As discussed above, the DHM lists each database to be backed up and associates the database to hosts that may perform a backup of the database. In some cases, the database may only be associated with only one host. In those cases, the host is assigned to the database.

In step 242, an unprocessed host is selected from the PSOL is selected based on the ranking of the hosts. The backup agent may select the highest ranked host that has not been processed.

In step 244, a determination is made about whether there is an unassigned database associated with the selected host. If there is an unassigned database associated with the selected host, the method proceeds to step 246; otherwise, the method proceeds to step 248.

In one or more embodiments of the invention, the determination in step 244 is made using host information. The backup agent may use the host information to identify the databases that the host may back up. The backup agent may determine whether any of the identified databases have already been assigned to be backed up by another host. Any of the identified databases that have not been assigned may be unassigned database.

In step 246, an unassigned database associated with the host that has the largest size is assigned to the selected host. The largest size may be identified using the DHM in which the size of each database is stored.

In step 248, the selected host is marked as processed.

In step 250, a determination is made about whether all hosts are processed. If all hosts are processed, the method proceeds to step 252, otherwise, the method proceeds to step 242.

In step 252, a Host-Database Mapping is populated using the assignments of hosts to databases. In one or more embodiments of the invention, the HDM is populated by specifying the databases to which the hosts have been assigned in step 246. In one or more embodiments of the invention, the HDM includes entries each corresponding to a host and the database(s) assigned to that host.

EXAMPLE

The following section describes an example. The example is not intended to limit the invention. The example may be illustrated in FIGS. 3A-3D. Turning to the example, consider a scenario in which a backup request specifies that backups of five databases (DB1, DB2, DB3, DB4, DB5) be generated by five hosts (Host 1, Host 2, Host 3, Host 4, Host 5). Generating a backup of each database may incur a backup load on the five hosts.

FIG. 3A shows Host Information (300) about the five hosts. The host information (300) specifies each host, an active database running on each host, and one or more passive databases stored on each host. A backup agent may to perform the method of FIG. 2A to evenly allocate the backup load among the five hosts. More specifically, the backup agent may use the host information (300) to generate a Database-Host Mapping (DHM) (310) as illustrated in FIG. 3B. The DHM (310) includes entries that each specifies a database to be backed up, a size of the database, and a list of hosts available to perform a backup of the database. The list of available hosts is determined by identifying the hosts that store the database as a passive database.

Following the method of FIG. 2A, the backup agent determines that the backup request did not include a Preferred Server Order List (PSOL). The backup agent may subsequently perform the method of FIG. 2B to generate a PSOL using resources available by each of the five hosts.

Following the method of FIG. 2B, the backup agent may assign a network bandwidth score, a compute score, and a storage availability score to each of the five hosts. The assigned scores are illustrated in FIG. 3B. Using the assigned scores, the backup agent may rank the five hosts. The assigned scores of each host may be summed, and the hosts may be ranked from highest summed score to lowest summed score. The resulting rank is illustrated in the priority section of the Generated PSOL (320).

Following the method of FIG. 2A, the backup agent may perform a data redistribution analysis as illustrated in FIG. 2C. This may include assigning databases that are only paired to one host to the corresponding host. Referring to FIGS. 3B, DB1 and DB4 are each only able to be backed up to one host (Host 5 and Host 3, respectively). Subsequently, the backup agent assigns Host 5 to DB1 and Host 3 to DB4 and marks the assigned hosts as processed.

Continuing with the data redistribution analysis, the backup agent may process each host to assign a database to be backed up. Host 1, being the highest-ranked unprocessed host, is selected first. The backup agent may use the host information (300) to identify the passive databases stored in the host. Because Host 1 only stores DB3, Host 1 may be assigned DB3 to back up. The next highest-ranked unprocessed host (i.e., Host 2) is selected. Host 2 stores DB2 and is therefore assigned to back up DB2. The following host to be processed is Host 4. Host 4 stores DB5 and DB2. Because DB2 has already been assigned to a different host, Host 4 may be assigned to back up DB5. A Host-Database Mapping (HDM) (330) may be populated using the aforementioned assignments as illustrated in FIG. 3D. Following the generation of the HDM (330), the backup agent may initiate a backup of the databases by prompting the five hosts to generate a backup of the corresponding assigned databases to be sent to a backup storage system.

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

Embodiments of the invention improve the operation of one or more computing devices. More specifically, embodiments of the invention improve the efficiency of generating backups of multiple databases across multiple computing devices by distributing a backup load caused by generating the backups. The backup load may be distributed using a mapping that identifies the computing devices generating the backups and the databases that each computing device can back up. Embodiments of the invention reduce the likelihood of "bottlenecking," which is a phenomenon that occurs when a larger backup load is applied to some computing devices over others. Embodiments of the invention reduce the likelihood of this phenomenon by identifying resources available by each computing device and distributing the backup load among the computing devices accordingly.

Thus, embodiments of the invention may address the problem of inefficient use of computing resources with generating backups. This problem arises due to the technological nature of the environment performing backups in which files are de-duplicated prior to storage in persistent storage.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for backing up databases, the method comprising:

in response to receiving a backup request, generating a Database-Host Mapping (DHM) associated with the backup request;

performing a database redistribution analysis based on the DHM and a preferred server order list (PSOL) to generate a Host-Database Mapping (HDM), wherein performing the database redistribution analysis comprises:

selecting an unprocessed host from the plurality of hosts specified in the PSOL;

identifying, using host information, at least two databases of the plurality of databases associated with the unprocessed host, wherein the at least two databases are unassigned in the HDM;

identifying a database of the at least two databases that has the largest size of the at least two databases; and assigning, in the HMD, the unprocessed host to the database; and initiating a backup of a plurality of databases using the plurality of hosts specified in the HDM.

2. The method of claim 1, further comprising:

prior to performing the database redistribution analysis, obtaining the PSOL, wherein the PSOL specifies an ordering of a plurality of hosts.

3. The method of claim 2, wherein the PSOL is obtained from a client.

4. The method of claim 2, wherein the PSOL is generated based on a resource analysis for the plurality of hosts.

5. The method of claim 4, wherein the resource analysis comprises determining a plurality of factors associated with each of the plurality of hosts and generating the ordering of the plurality of hosts based on the plurality of factors.

6. The method of claim 5, wherein the plurality of factors comprises at least one selected from a group consisting of network bandwidth, storage availability, and available computing resources.

7. The method of claim 1, further comprising:

generating the DHM using host information for the plurality of hosts, wherein the host information specifies which of the plurality of databases are associated with each of the plurality of hosts, wherein the DHM maps each of the plurality of databases to at least one of plurality of hosts.

8. The method of claim 1, further comprising:

prior to selecting the unprocessed host, assigning a database of the plurality of databases to a host of the plurality of hosts, wherein the database is only associated with the host in the DHM; and assigning, in the HDM, the database to the host, wherein after the assigning, the host is marked as processed.

9. The method of claim 1, wherein each of the plurality of databases is a passive database.

10. A non-transitory computer readable medium comprising computer readable program code, which when executed by a computer processor enables the computer processor to perform a method for backing up databases, the method comprising:

in response to receiving a backup request, generating a Database-Host Mapping (DHM) associated with the backup request;

performing a database redistribution analysis based on the DHM and a preferred server order list (PSOL) to generate a Host-Database Mapping (HDM), wherein performing the database redistribution analysis comprises:

selecting an unprocessed host from the plurality of hosts specified in the PSOL;

identifying, using host information, at least two databases of the plurality of databases associated with the unprocessed host, wherein the at least two databases are unassigned in the HDM;

identifying a database of the at least two databases that has the largest size of the at least two databases; and assigning, in the HMD, the unprocessed host to the database; and initiating a backup of a plurality of databases using the plurality of hosts specified in the HDM.

11. The non-transitory computer readable medium of claim 10, further comprising:

prior to performing the database redistribution analysis, obtaining the PSOL, wherein the PSOL specifies an ordering of a plurality of hosts.

12. The non-transitory computer readable medium of claim 11, wherein the PSOL is obtained from a client.

13. The non-transitory computer readable medium of claim 11, wherein the PSOL is generated based on a resource analysis for the plurality of hosts.

14. The non-transitory computer readable medium of claim 13, wherein the resource analysis comprises determining a plurality of factors associated with each of the plurality of hosts and generating the ordering of the plurality of hosts based on the plurality of factors.

15. The non-transitory computer readable medium of claim 14, wherein the plurality of factors comprises at least one selected from a group consisting of network bandwidth, storage availability, and available computing resources.

16. The non-transitory computer readable medium of claim 10, further comprising:

generating the DHM using host information for the plurality of hosts, wherein the host information specifies which of the plurality of databases are associated with each of the plurality of hosts, wherein the DHM maps each of the plurality of databases to at least one of plurality of hosts.

17. The non-transitory computer readable medium of claim 10, further comprising:

prior to selecting the unprocessed host, assigning a database of the plurality of databases to a host of the plurality of hosts, wherein the database is only associated with the host in the DHM; and assigning, in the HDM, the database to the host, wherein after the assigning, the host is marked as processed.

18. The non-transitory computer readable medium of claim 10, wherein each of the plurality of databases is a passive database.

* * * * *